(12) United States Patent
van Niekerk et al.

(10) Patent No.: US 9,701,049 B2
(45) Date of Patent: Jul. 11, 2017

(54) METHOD FOR PRODUCING A FIBER-REINFORCED PLASTICS PART WITH A CONNECTING REGION

(71) Applicant: Bayerische Motoren Werke Aktiengesellschaft, Munich (DE)

(72) Inventors: Johann van Niekerk, Munich (DE); Maik Hammer, Eching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 417 days.

(21) Appl. No.: 14/253,400

(22) Filed: Apr. 15, 2014

(65) Prior Publication Data

US 2014/0225307 A1    Aug. 14, 2014

Related U.S. Application Data

(63) Continuation of application No. PCT/EP2012/068971, filed on Sep. 26, 2012.

(30) Foreign Application Priority Data

Oct. 26, 2011    (DE) ........................ 10 2011 085 225

(51) Int. Cl.
*B29C 45/14*    (2006.01)
*B29C 70/48*    (2006.01)
*B29C 70/54*    (2006.01)

(52) U.S. Cl.
CPC .......... *B29C 45/14* (2013.01); *B29C 45/1418* (2013.01); *B29C 45/14336* (2013.01); *B29C 70/48* (2013.01); *B29C 70/545* (2013.01)

(58) Field of Classification Search
CPC ....... B29C 45/14; B29C 70/48; B29C 70/545; B29C 45/1418; B29C 45/14336
See application file for complete search history.

(56) References Cited

U.S. PATENT DOCUMENTS

| 914,915 | A | * | 3/1909 | Bedell | ..................... F16B 37/12 164/111 |
| 2,291,545 | A | * | 7/1942 | Ganz | ................. B29C 45/14336 24/90.1 |

(Continued)

FOREIGN PATENT DOCUMENTS

| CA | 2166714 A1 | 11/1995 |
| DE | 1 107 396 | 5/1961 |

(Continued)

OTHER PUBLICATIONS

Chinese language Office Action dated Apr. 27, 2015 with English translation (Eighteen (18) pages).

(Continued)

*Primary Examiner* — Matthew Daniels
(74) *Attorney, Agent, or Firm* — Crowell & Moring LLP

(57) ABSTRACT

A process for producing a fiber-reinforced plastic part, includes the steps of providing a mat-type reinforcing matrix consisting of a fiber material; inserting the reinforcing matrix into an injection molding tool; closing the injection molding tool; placing a liquid thermosetting plastic material in the injection molding tool, the reinforcing matrix being saturated with plastic material. In a connection area, in which the plastic part to be produced is to be connectable later with a further component, the reinforcing matrix is deformed such that a trough-type bulging-out is formed. A place holder element is inserted into the bulging-out, and the bulging-out is filled up with plastic material around the place holder element.

9 Claims, 1 Drawing Sheet

(56) References Cited

U.S. PATENT DOCUMENTS

| | | | |
|---|---|---|---|
| 2,548,004 A * | 4/1951 | Duefrene | A44B 17/0029 24/662 |
| 2,808,875 A * | 10/1957 | Bargen | A47C 7/16 297/183.1 |
| 2,847,712 A * | 8/1958 | Pollard | B29C 45/14786 244/123.1 |
| 2,903,388 A | 9/1959 | Jonke et al. | |
| 3,016,578 A * | 1/1962 | Rohe | B64C 3/00 264/262 |
| 3,019,865 A * | 2/1962 | Rohe | F16B 5/01 411/82 |
| 3,176,057 A * | 3/1965 | Peters | B29C 45/14 101/170 |
| 3,737,268 A * | 6/1973 | Ryder | B29C 45/262 249/59 |
| 3,890,679 A * | 6/1975 | Simon | A41H 37/001 24/618 |
| 4,059,136 A * | 11/1977 | Wallace | F16B 39/225 118/204 |
| 4,123,494 A * | 10/1978 | Evrard | B29C 45/14065 264/258 |
| 4,236,476 A * | 12/1980 | Solf | B63B 35/7959 114/39.32 |
| 4,418,031 A * | 11/1983 | Doerer | B27N 3/12 264/122 |
| 4,705,469 A | 11/1987 | Liebl et al. | |
| 4,735,753 A * | 4/1988 | Ackermann | A41H 37/04 156/580.1 |
| 4,842,571 A | 6/1989 | Liebl et al. | |
| 5,356,588 A * | 10/1994 | Hara | B29C 45/14786 264/257 |
| 5,588,392 A | 12/1996 | Bailey | |
| 5,756,034 A | 5/1998 | Newton et al. | |
| 5,927,778 A | 7/1999 | Uytterhaeghe et al. | |
| 6,276,652 B1 | 8/2001 | Rieger | |
| 7,186,105 B2 * | 3/2007 | Cesano | B29C 35/02 425/112 |
| 2008/0028574 A1 | 2/2008 | Mack et al. | |
| 2011/0204611 A1 | 8/2011 | Ziegler et al. | |

FOREIGN PATENT DOCUMENTS

| | | |
|---|---|---|
| DE | 195 26 934 A1 | 1/1997 |
| DE | 101 01 271 A1 | 8/2002 |
| DE | 10 2004 054 228 A1 | 6/2006 |
| EP | 0 221 851 B1 | 12/1991 |
| GB | 2 404 894 A | 2/2005 |

OTHER PUBLICATIONS

German Office Action dated Jun. 8, 2012 (six (6) pages).
International Search Report dated Jan. 30, 2013 with English translation (eight (8) pages).
Ferret et al., "Metal inserts in structural composite materials manufactured by RTM," Elsevier Science Limited, 1997, pp. 693-700, vol. 29A, Great Britain, XP004120881.
German-language Examination Report issued in counterpart German Application No. 10 2011 085 225.5 dated Jun. 28, 2016 (Four (4) pages).

* cited by examiner

METHOD FOR PRODUCING A FIBER-REINFORCED PLASTICS PART WITH A CONNECTING REGION

CROSS REFERENCE TO RELATED APPLICATIONS

This application is a continuation of PCT International Application No. PCT/EP2012/068971, filed Sep. 26, 2012, which claims priority under 35 U.S.C. §119 from German Patent Application No. 10 2011 085 225.5, filed Oct. 26, 2011, the entire disclosures of which are herein expressly incorporated by reference.

BACKGROUND AND SUMMARY OF THE INVENTION

The present invention relates to a process for producing a fiber-reinforced plastic part.

For some time, BMW AG has been working on processes for the series production of carbon-fiber-reinforced vehicle body components. In the production of vehicle body parts, a reinforcing matrix is frequently used, which consists of a fiber material and is placed in an injection molding tool where a liquid thermosetting resin is sprayed around it. The liquid thermosetting resin saturates the reinforcing matrix. The reinforcing matrix is a "mat-type" formation, for example, in the shape of a woven material, a scrim, a knit, a crocheted material, or the like.

In the vehicle body construction field, the so-called "mixed construction", i.e. the connection of components consisting of different materials, for example, of carbon-fiber-reinforced plastic components with steel or aluminum components, presents a considerable challenge. Gluing represents one possibility of connecting such different materials with one another.

As an alternative, fiber-reinforced plastic parts and metal parts may also be mutually connected by way of form-locking connection elements, which, however, frequently requires that at least one of the two components to be connected with one another has a passage hole. Passage holes should, however, be avoided, if possible, for reasons of stability, among others, in the case of fiber-reinforced plastic components.

It is an object of the invention to provide a process for producing a fiber-reinforced plastic part, which can be connected in a simple manner with other components without requiring any perforation of the plastic part to be produced.

This and other objects are achieved by a process for producing a fiber-reinforced plastic part, the process including the acts of: providing a mat-type reinforcing matrix comprised of a fiber material, inserting the reinforcing matrix into a tool, particularly an injection molding tool, and closing the tool, wherein in a connection area, in which the plastic part to be produced is to be connectable later with a further component, the reinforcing matrix is deformed such that a trough-type bulging-out is formed, a place holder element being inserted into the bulging-out, and the bulging-out being filled up with plastic material around the place holder element.

The starting point of the invention is a process for producing a fiber-reinforced plastic part, in which case a mat-type reinforcing matrix comprised of fiber material is used for stiffening the plastic part to be produced. The "fibers" contained in the reinforcing matrix may, for example, be carbon fibers, glass fibers, metal wires, or the like or combinations of various fiber types. The mat-type formation, i.e. the reinforcing matrix, may be present in the form of a woven material, a scrim, a knit, a crocheted material, or the like, or in combinations of such structures.

In a first step, the mat-type reinforcing matrix is placed in a tool. The tool is a resin transfer molding tool. Such a tool consists, for example, of a tool bottom part and a tool top part that can be moved relative thereto, which, between one another, form a mold cavity corresponding to the geometry of the plastic parts to be produced. After the placing of the reinforcing matrix, the molding tool will be closed. A liquid thermosetting plastic material will then be injected, which fills up the mold cavity and saturates the reinforcing matrix. The tool can be heated in the process. In particular, the plastic material may be a thermosetting synthetic resin.

As an alternative to the use of an injection molding tool, by which liquid plastic material is injected into a cavity of the tool, it may also be provided that a stiffening matrix saturated, coated or surrounded by a thermosetting starting material is used as the starting material or that the reinforcing matrix is painted outside the tool, for example, manually, with such a plastic material, or plastic material is applied in a different manner to the reinforcing matrix and that the reinforcing matrix is subsequently introduced into a (wet-pressing) tool and reshaped into a plastic part.

An aspect of the invention is that the reinforcing matrix is bulged out in a trough-type manner in a "connection area", i.e. in an area in which the plastic part to be produced is to be connected later with a further component. For this purpose, the injection molding tool or the top or bottom tool has a corresponding bulging-out or bulging-in in the connection area. A "space holder element" is placed into the trough-type bulging-out of the reinforcing matrix before the injection of the plastic material. Subsequently, the mold cavity including the trough-type bulging-out is filled up with liquid plastic. The "place holder element" has the task of keeping a predefined area of the plastic part to be produced free of plastic material.

According to a further development of the invention, the place holder element will be removed from the created plastic part after the setting of the plastic material.

This results in a cup-type indentation in the plastic part at the point at which the place holder element had been situated. Subsequently, a connection element can be inserted into this cup-type indentation by way of which the plastic part is connected with a further component, for example, with a (further) vehicle body component.

After the setting of the plastic material, the place holder element can, for example, simply be pulled out of the indentation.

As an alternative, a place holder element may also be used on whose outer circumference a thread is provided, so that, when the bulging-out is filled up with plastic material, a cup-shaped indentation is obtained which has a corresponding mating thread. After the setting of the plastic material, the place holder element can be unscrewed from the mating thread, so that a cup-shaped indentation is obtained which is provided with the mating thread. A cup-type indentation having a thread has the advantage that a connection element provided with a corresponding thread can be screwed directly into the cup-type indentation or into the mating thread of the cup-type indentation, whereby a high connection stability can be achieved. The connection element can additionally be glued into the cup-type connection, whereby a still higher connection stability can be achieved. A connection element can naturally also be glued into a cup-type connection which has no thread.

According to a further development of the invention, a connection element is used which has a head projecting from the cup-type indentation. The head may, for example, have a multi-edged shape. As an alternative, the head may also completely or partially have the shape of a sphere or completely or partially have a shape similar to a sphere. A spherical head or a head similar to a sphere has the advantage that a snap-on element can be snapped onto it in a simple manner, which snap-on element is part of an additional component to be connected with the plastic part. In contrast to angular connection elements, spherical-head-type connection elements or connection elements similar to a spherical head have the advantage that a catching or jamming of a snap-on element interacting with the latter will be almost impossible.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
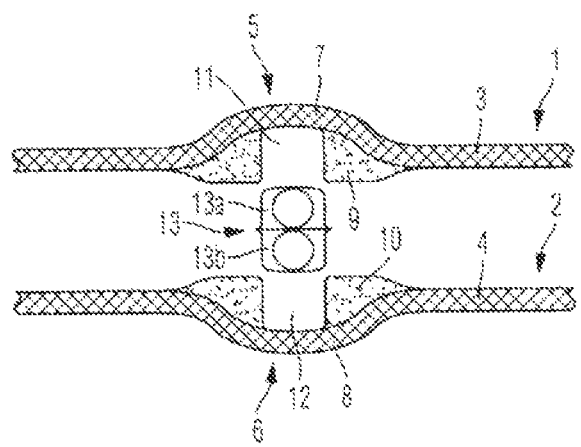
FIG. 1 illustrates an embodiment of the present invention wherein two fiber-reinforced plastic parts are to be mutually connected.

FIG. 1 illustrates two fiber-reinforced plastic parts 1, 2 to be mutually connected. In its interior, each of the two plastic parts 1, 2 has a reinforcing matrix 3, 4, which consists of a fiber material and which is saturated with a plastic material that has already been set here, and injection molding with this plastic material has already taken place around this matrix.

In the connection areas 5, 6 of the two plastic parts 1, 2, the latter each have a bulging-out 7, 8. However, in the area of the bulging-out 7 and 8 respectively, the reinforcing matrix has no hole or the like so that the stability of the plastic parts 1, 2 remains essentially unaffected by the bulges 7, 8.

During the production of the plastic parts 1, 2, the concerned reinforcing matrix 3 and 4 respectively is first inserted into a resin transfer molding tool, the reinforcing matrix 3, 4 being deformed in the connection area 5, 6 corresponding to the tool contour, whereby the bulges 7, 8 are obtained.

Figure 5:
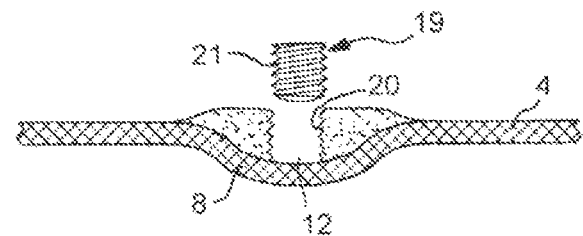
FIG. 5 illustrates an embodiment wherein a cylindrical element equipped with a thread is used as a place holder element.

Subsequently, a place holder element 19 (see FIG. 5) will be arranged in the area of the bulging-out 7 and 8 respectively. The place holder element may be placed, for example, by use of a slide element of the tool or, from the outside, by use of an element inserted into the tool. After the placing of the place holder element in the area of the bulging-out 7 and 8, respectively, the tool cavity is filled up with liquid synthetic resin, whereby the entire stiffening matrix 3 and 4, respectively, is saturated with plastic material or synthetic resin. In this case, also the corresponding bulging-out 7 and 8, respectively, is filled up with synthetic resin, whereby a synthetic resin bed 9 and 10, respectively, is obtained that extends around the placeholder element.

After the setting of the synthetic resin, the place holder element will be removed from the plastic part 1 and 2, respectively. If the place holder element is a sleeve-type element 19 without any undercut, the place holder element can simply be pulled out.

As an alternative, a cylindrical element 19 equipped with a thread 21 can also be used as the place holder element (see FIG. 5), which element will be unscrewed from the synthetic resin bed 9 and 10, respectively, after the setting of the plastic material, whereby the cup-shaped indentation 11 and 12, respectively, illustrated in FIG. 1 is created. In the case of a place holder element equipped with a thread, the cup-type indentation 11 and 12, respectively, has a mating thread 20 on its interior circumference, which mating thread is complementary with respect to the thread 21 of the place holder element 19. A connection element 13 having a complementary thread can be screwed into the complementary mating thread 20.

In the case of the embodiment illustrated in FIG. 1, a connection element 13 is used which has an upper connection section 13a and a lower connection section 13b. The upper connection section 13a is pressed into the upper cup-type indentation 11. The lower connection section 13b is pressed into the lower cup-type indentation 12 of the plastic part 2. The connection sections 13a, 13b may additionally be glued into the indentations 11 and 12, respectively. In this manner—as illustrated in FIG. 1—for example, two fiber-reinforced plastic parts can be mutually connected. However, similarly, components consisting of different materials may be connected with one another, for example, a fiber-reinforced plastic part with a steel or aluminum component.

Figure 2:
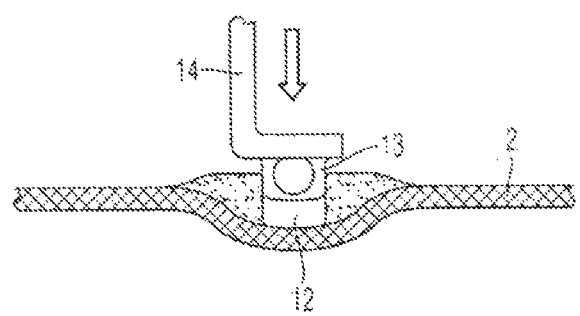
FIG. 2 illustrates an embodiment of the present invention in which a connection element is pressed into a cup-type indentation of a plastic component.

FIG. 2 illustrates an embodiment, in which a connection element 13 is pressed into the cup-type indentation 12 of the plastic component 2, wherein a sheet plate component 14 projects from the connection element 13.

Figure 3:
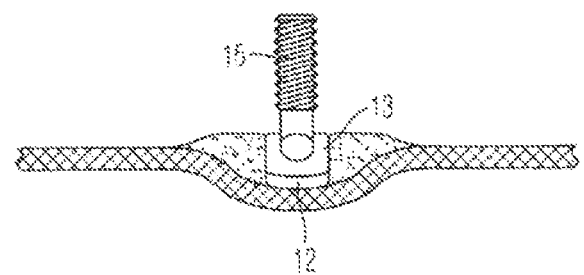
FIG. 3 illustrates another embodiment in which a connection element is pressed into the cup-type indentation of the plastic component.

FIG. 3 illustrates an embodiment, in which a connection element 13 is pressed into the cup-type indentation 12, wherein a bolt barrel 15 projects upward from the connection element 13.

Figure 4:
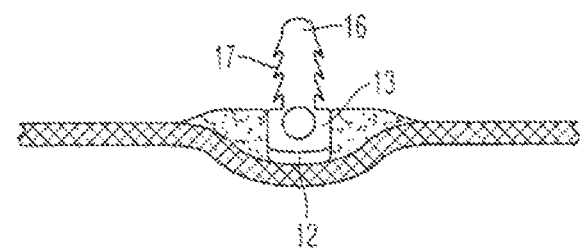
FIG. 4 illustrates yet another embodiment in which a connection element is pressed into the cup-type recess of the plastic component.

The embodiment of FIG. 4 illustrates a connection element 13 pressed into the cup-type recess 12, from which connection element 13 a pin-type peg 16 projects which has several detent lugs 17 arranged behind one another.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for producing a fiber-reinforced plastic part, the process comprising the acts of:
   providing a mat-type reinforcing matrix composed of a fiber material;
   inserting the reinforcing matrix into a tool;
   closing the tool;
   deforming the reinforcing matrix in the tool in a connection area in which the plastic part to be produced is subsequently intended to be connectable to a further component, the deforming creating a trough-type, bulge;

inserting a place holder element with a threaded outer circumference into the bulge, wherein the bulge locally corresponds to an area of the place holder element;

filling up the bulge with plastic material around the threaded outer circumference of the place holder element;

setting of the plastic material around the threaded outer circumference of the place holder element to form a cup-type, indentation with a corresponding mating thread in the cup-type indentation;

unscrewing the place holder element from the cup-type indentation.

2. The process according to claim 1, further comprising the act of:

placing a connection element into the cup-type indentation, said connection element being configured to connect the plastic part with a further component.

3. The process according to claim 1, further comprising the act of:

screwing a connection element into the corresponding mating thread of the cup-type indentation.

4. The process according to claim 3, wherein the connection element comprises a head that projects out of the cup-type indentation, the head having a spherical shape, and connecting the further component via a snap-on connection with the head.

5. The process according to claim 3, wherein the connection element is glued into the cup-type indentation.

6. The process according to claim 1, further comprising the act of:

when the tool is closed, providing a liquid thermosetting plastic material into the tool, wherein the reinforcing matrix is saturated with the liquid thermosetting plastic material.

7. The process according to claim 6, wherein the tool is an injection molding tool.

8. The process according to claim 1, wherein the tool is an injection molding tool.

9. The process according to claim 1, wherein the plastic material bulges beyond a plane defined by a surface of the reinforcing matrix.

\* \* \* \* \*